United States Patent
Kim et al.

(10) Patent No.: US 9,036,374 B2
(45) Date of Patent: May 19, 2015

(54) SWITCHING MODE POWER SUPPLY AND CONTROL METHOD THEREOF

(71) Applicant: Samsung Electro-Mechanics Co., Ltd., Suwon, Gyunggi-do (KR)

(72) Inventors: Jung Hyun Kim, Gyunggi-do (KR); Hwan Cho, Gyunggi-do (KR); Byung Hoon Kim, Gyunggi-do (KR)

(73) Assignee: SAMSUNG ELECTRO-MECHANICS CO., LTD., Suwon, Gyunggi-Do (KR)

( * ) Notice: Subject to any disclaimer, the term of this patent is extended or adjusted under 35 U.S.C. 154(b) by 139 days.

(21) Appl. No.: 13/829,700

(22) Filed: Mar. 14, 2013

(65) Prior Publication Data
US 2014/0185343 A1    Jul. 3, 2014

(30) Foreign Application Priority Data
Dec. 28, 2012 (KR) .................. 10-2012-0157018

(51) Int. Cl.
*H02M 3/335* (2006.01)
*H02M 1/00* (2006.01)

(52) U.S. Cl.
CPC .. *H02M 3/33507* (2013.01); *H02M 2001/0029* (2013.01); *H02M 2001/0032* (2013.01); *Y02B 70/16* (2013.01)

(58) Field of Classification Search
CPC .......... H02M 1/4225; H02M 3/33507; H02M 3/33523; H02M 3/33569; Y02B 70/126
USPC ........................ 363/20, 21.01, 89, 95, 97, 131
See application file for complete search history.

(56) References Cited

U.S. PATENT DOCUMENTS

| | | | | |
|---|---|---|---|---|
| 6,021,052 A | * | 2/2000 | Unger et al. | 363/26 |
| 6,839,247 B1 | * | 1/2005 | Yang et al. | 363/21.11 |
| 6,842,353 B2 | * | 1/2005 | Yamada et al. | 363/89 |
| 6,980,444 B2 | * | 12/2005 | Takahashi | 363/21.18 |
| 7,079,404 B2 | * | 7/2006 | Hong et al. | 363/21.01 |
| 7,583,522 B2 | * | 9/2009 | Hall et al. | 363/95 |
| 8,098,502 B2 | * | 1/2012 | Mao et al. | 363/21.03 |
| 2008/0231247 A1 | | 9/2008 | Uehara | |

FOREIGN PATENT DOCUMENTS

JP    2005-198401 A    7/2005
KR    2008-0077046 A    8/2008

OTHER PUBLICATIONS

Yasuyuki Kanai et al; Analysis of Self-excited Resonant DC-DC Converter to Determine Oscillation Condition; IEEE Journal; pp. 801-804—issued in 1997.
Korean Office Action issued in Application No. 10-2012-0157018 dated Dec. 2, 2013.

* cited by examiner

*Primary Examiner* — Adolf Berhane
(74) *Attorney, Agent, or Firm* — McDermott Will & Emery LLP (57) ABSTRACT

There is provided a switching mode power supply having primary and secondary induction coils inductively coupled to each other and converting a voltage applied to the primary induction coil to supply the converted voltage to the secondary induction coil, the switching mode power supply including a power switching unit switching the voltage applied to the primary induction coil, a load information obtaining unit obtaining load information relating to a load connected to the secondary induction coil, a bias current controlling unit controlling a switching driving current based on the load information; and a driving unit driving the power switching unit based on the load information and the switching driving current.

12 Claims, 6 Drawing Sheets

SWITCHING MODE POWER SUPPLY AND CONTROL METHOD THEREOF

CROSS-REFERENCE TO RELATED APPLICATIONS

This application claims the priority of Korean Patent Application No. 10-2012-0157018 filed on Dec. 28, 2012, in the Korean Intellectual Property Office, the disclosure of which is incorporated herein by reference.

BACKGROUND OF THE INVENTION

1. Field of the Invention

The present invention relates to a switching mode power supply capable of varying charging and discharging currents according to a load, and a control method thereof.

2. Description of the Related Art

A switching mode power supply (SMPS) is an apparatus for rectifying and smoothing alternating current (AC) power and applying the rectified and smoothed power to a primary winding of a transformer, inducing the power applied to the primary winding to a secondary winding having a preset turns ratio between the primary winding and the secondary winding by a switching operation of a power switch, and then rectifying and smoothing the power induced to the secondary winding to obtain direct current (DC) power.

Generally, a power supply device such as a switching mode power supply, or the like, includes a power switch in order to convert power. In addition, such a power supply device includes a switching driving circuit generating a driving signal for driving the power switch.

Meanwhile, as a load connected to the switching mode power supply is increased, an instantaneous switching reaction of the power switch is required.

However, in the case in which the power switch is set to perform the instantaneous switching reaction, when the load is reduced, the switching mode power supply exhibits unstable output characteristics.

Therefore, there is a need to introduce a switching mode power supply having appropriate response characteristics to a load.

The following Related Art Document (Patent Document 1), which relates to a switching regulator suppressing overshooting of an output voltage in the case in which a load is rapidly decreased, does not disclose a configuration of regulating a switching current of a power switch according to an output load amount.

RELATED ART DOCUMENT (Patent Document 1) Korean Patent Laid-Open Publication No. 2008-0077046

SUMMARY OF THE INVENTION

An aspect of the present invention provides a switching mode power supply having appropriate response characteristics to a load.

An aspect of the present invention also provides a switching mode power supply capable of having a prompt response speed under high load conditions and providing a stable output under low load conditions.

According to an aspect of the present invention, there is provided a switching mode power supply having primary and secondary induction coils inductively coupled to each other and converting a voltage applied to the primary induction coil to supply the converted voltage to the secondary induction coil, the switching mode power supply including: a power switching unit switching the voltage applied to the primary induction coil; a load information obtaining unit obtaining load information relating to a load connected to the secondary induction coil; a bias current controlling unit controlling a switching driving current based on the load information; and a driving unit driving the power switching unit based on the load information and the switching driving current.

The load information obtaining unit may output a load voltage.

The bias current controlling unit may control a first switching driving current, a charging current for the power switching unit, based on the load information, and may control a second switching driving current, a discharging current for the power switching unit, based on the load information.

The bias current controlling unit may include: an amplifier outputting a control current or a control voltage based on the load voltage; and a current source controlling the switching driving current based on the control current or the control voltage.

The bias current controlling unit may include: a first amplifier outputting a first control current or a first control voltage based on the load voltage; and a first bias current source controlling a first switching driving current, a charging current for the power switching unit, based on the first control current or the first control voltage.

The bias current controlling unit may include: a second amplifier outputting a second control current or a second control voltage based on the load voltage; and a second bias current source controlling a second switching driving current, a discharging current for the power switching unit, based on the second control current or the second control voltage.

The bias current controlling unit may include a voltage-current converter.

The driving unit may include: a pulse information generator generating first pulse information and second pulse information based on the load voltage; an upper switch driven by the first switching driving current and the first pulse information; and a lower switch driven by the second switching driving current and the second pulse information.

According to another aspect of the present invention, there is provided a control method of a switching mode power supply having primary and secondary induction coils inductively coupled to each other and converting a voltage applied to the primary induction coil to supply the converted voltage to the secondary induction coil, the control method including: obtaining load information relating to a load connected to the secondary induction coil; controlling a switching driving current based on the load information; and switching the voltage applied to the primary induction coil by the switching driving current.

The controlling of the switching driving current may include: controlling a first switching driving current, a charging current for a power switching unit, based on the load information; and controlling a second switching driving current, a discharging current for the power switching unit, based on the load information.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Figure 1:
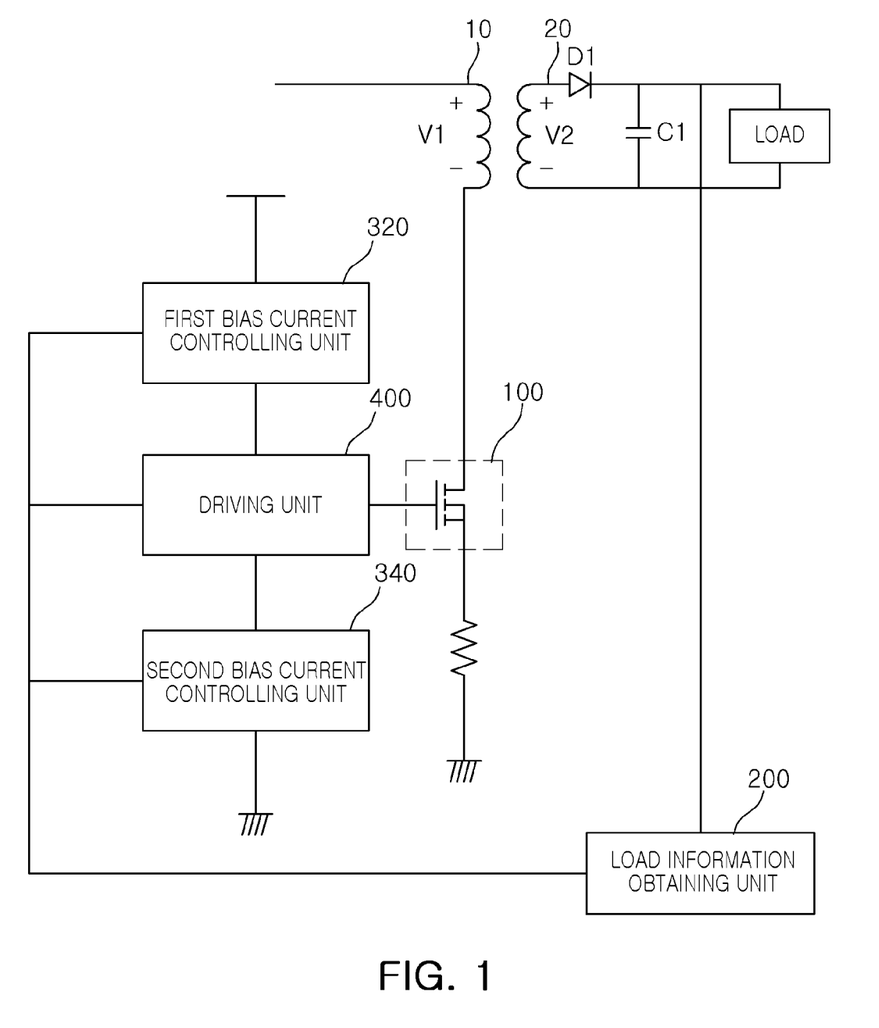
FIG. 1 is a block diagram illustrating a schematic configuration of a switching mode power supply according to an embodiment of the present invention.

FIG. 1 is a block diagram illustrating a schematic configuration of a switching mode power supply according to an embodiment of the present invention.

Referring to FIG. 1, the switching mode power supply may include primary and secondary induction coils 10 and 20, a diode element D1, a capacitor element C1, a power switching unit 100, a load information obtaining unit 200, a first bias current controlling unit 320, a second bias current controlling unit 340, and a driving unit 400.

The primary and secondary induction coils 10 and 20 may be inductively coupled to each other and have a turns ratio according to a voltage to be output. A power supplying unit may smooth an alternating current (AC) voltage input through an adaptor, or the like, into direct current (DC) power and apply the smoothed DC power to the primary induction coil 10, and a voltage V1 applied across the primary induction coil 10 may be induced as a voltage V2 that is in proportion to the turns ratio, to thereby be applied to the secondary induction coil 20.

The diode element D1 and the capacitor element C1 may rectify and smooth the voltage induced to the secondary induction coil 20 to generate an output voltage.

The output voltage may be supplied to a load connected to an output terminal in parallel.

The power switching unit 100 may switch and control the voltage applied to the primary induction coil 10 according to a switching control signal input from the driving unit 400, thereby inducing the voltage having a predetermined level to the secondary induction coil 20.

The load information obtaining unit 200 may obtain load information from the load connected to the switching mode power supply. For example, the load information may include information on load impedance, a load voltage, a load current, and the like.

The first bias current controlling unit 320 and the second bias current controlling unit 340 may control a switching driving current based on the load information. The switching driving current means a current applied to the power switching unit 100.

For example, the first bias current controlling unit 320 may control a first switching driving current, a charging current for the power switching unit, based on the load information. In addition, the second bias current controlling unit 340 may control a second switching driving current, a discharging current for the power switching unit, based on the load information.

The driving unit 400 may drive the power switching unit 400 based on the load information and the switching driving current.

For example, the driving unit 400 may generate pulse information for driving the power switching unit 100 and apply the switching control signal based on the pulse information and the switching driving current to the power switching unit 400.

Figure 2:
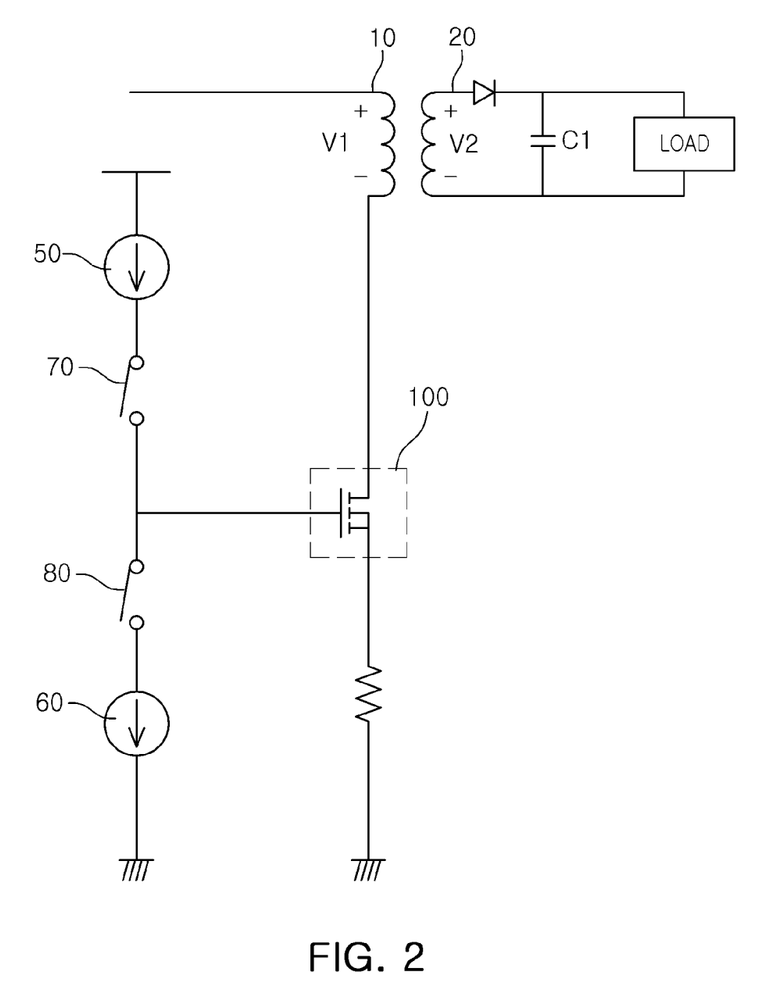
FIG. 2 is a circuit diagram illustrating a current source supplying a switching driving current.

FIG. 2 is a circuit diagram illustrating a current source supplying the switching driving current.

Referring to FIG. 2, an upper switch 70 may apply a switching control signal based on the first switching driving current and first pulse information to the power switching unit 100.

The first switching driving current may be a charging current for the power switching unit 100. Therefore, a rising gradient of the switching control signal may be determined depending on a magnitude of the first switching driving current.

For example, the greater the magnitude of the first switching driving current is, the steeper the rising gradient of the switching control signal is. In addition, the smaller the magnitude of the first switching driving current is, the gentler the rising gradient of the switching control signal is.

A lower switch 80 may apply a switching control signal based on the second switching driving current and second pulse information to the power switching unit 100.

The second switching driving current may be a discharging current for the power switching unit 100.

Therefore, a falling gradient of the switching control signal may be determined depending on a magnitude of the second switching driving current.

For example, the greater the magnitude of the second switching driving current is, the steeper the falling gradient of the switching control signal is. In addition, the smaller the magnitude of the second switching driving current, the gentler the falling gradient of the switching control signal is.

Figure 3A:
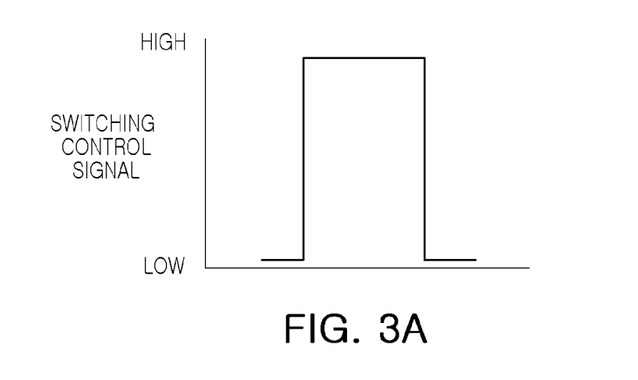
FIGS. 3A and 3B are diagrams respectively illustrating a rising gradient and a falling gradient of a switching control signal according to the switching driving current.
Figure 3B:
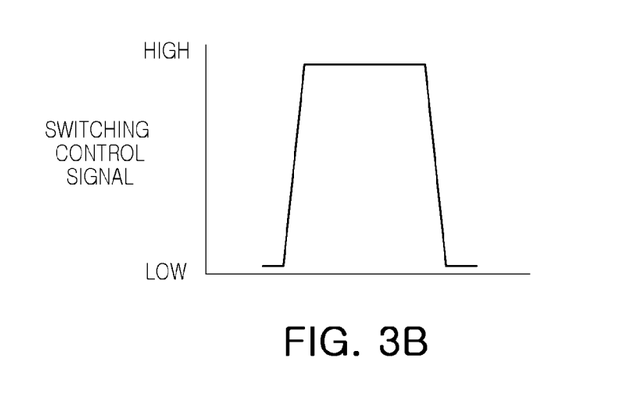

FIGS. 3A and 3B are diagrams respectively illustrating a rising gradient and a falling gradient of a switching control signal according to the switching driving current.

In the case in which the magnitude of the switching driving current is great with respect to predetermined pulse information, the rising gradient and the falling gradient of the switching control signal may be steepened (See FIG. 3A).

In the case in which the magnitude of the switching driving current is low with respect to predetermined pulse information, the rising gradient and the falling gradient of the switching control signal may be gentle (See FIG. 3B).

As shown in FIG. 2, the switching mode power supply according to the embodiment of the present invention may include a first variable current source 50 controlling the first switching driving current. In addition, the switching mode power supply may include a second variable current source 60 controlling the second switching driving current.

Further, according to the embodiment of the present invention, the first variable current source 50 may control the first switching driving current according to the load connected to the switching mode power supply. For example, the larger the load is, the higher the first switching driving current is.

Further, according to the embodiment of the present invention, the second variable current source 60 may control the second switching driving current according to the load connected to the switching mode power supply. For example, the larger the load is, the higher the second switching driving current is.

Figure 4:
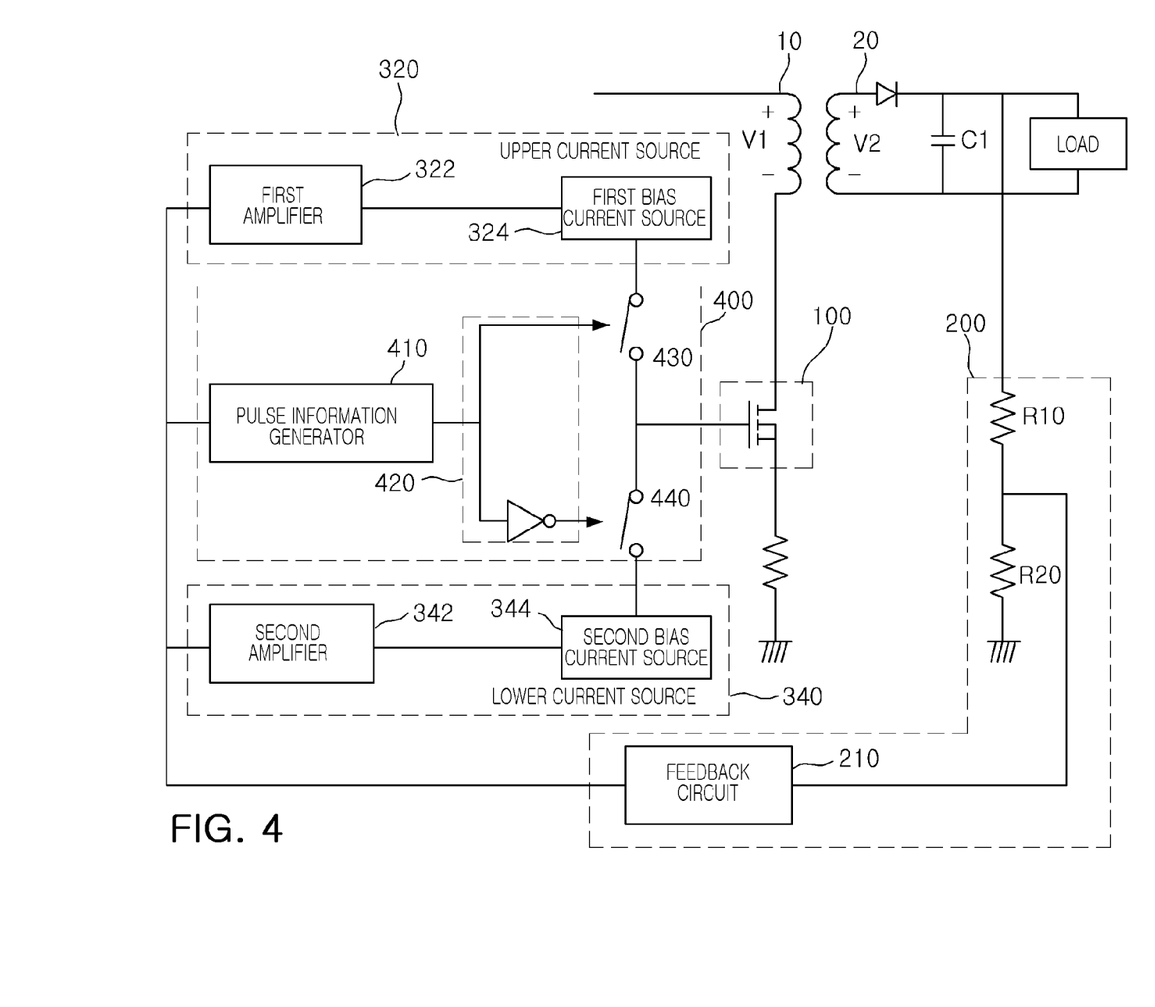
FIG. 4 is a block diagram illustrating the switching mode power supply according to the embodiment of the present invention.

FIG. 4 is a block diagram illustrating the switching mode power supply according to the embodiment of the present invention.

Referring to FIG. 4, the load information obtaining unit 200 may output a load voltage.

The load information obtaining unit 200 may include a first resistor element R10, a second resistor element R20, and a feedback circuit 210.

The feedback circuit 210 may transfer division voltages divided by the first and second resistor elements R10 and R20 to the first bias current controlling unit 320, the second bias current controlling unit 340, and the driving unit 400.

The bias current controlling unit may include an amplifier outputting a control current or a control voltage based on the load information and a current source controlling the switching driving current based on the control current or the control voltage. For example, the amplifier may output the control current or the control voltage based on the load voltage.

Referring to FIG. 4, the bias current controlling unit may include the first bias current controlling unit 320 and the second bias current controlling unit 340.

The first bias current controlling unit 320 may control the first switching driving current, the charging current for the power switching unit 100.

More specifically, the first bias current controlling unit 320 may include a first amplifier 322 and a first bias current source 324.

The first amplifier 322 may output the control current or the control voltage for controlling the first bias current source 324 based on the load voltage. For example, the first amplifier 322 may be a voltage input-voltage output amplifier or a voltage input-current output amplifier.

In addition, the first bias current source may control the charging current (the first switching driving current) for the power switching unit 100 based on the control current or the control voltage. For example, the first bias current source may be a voltage control current source or a current control current source.

Preferably, the first bias current controlling unit 320 may increase the charging current as the load is increased. This is because that in the case in which the load is high, as a pulse rising gradient is steepened, a system response speed is improved.

The first bias current controlling unit 320 may decrease the charging current as the load is reduced. The reason is that in the case in which the load is low, as the pulse rising gradient is gentle, system stability is improved.

The second bias current controlling unit 340 may control the second switching driving current, the discharging current for the power switching unit 100.

More specifically, the second bias current controlling unit 340 may include a second amplifier 342 and a second bias current source 344.

The second amplifier 342 may output the control current or the control voltage for controlling the second bias current source 344 based on the load voltage. For example, the second amplifier 342 may be a voltage input-voltage output amplifier or a voltage input-current output amplifier.

In addition, the second bias current source may control the discharging current (the second switching driving current) for the power switching unit 100 based on the control current or the control voltage. For example, the second bias current source may be a voltage control current source or a current control current source.

Preferably, the second bias current controlling unit 340 may increase the discharging current as the load is increased. The reason is that in the case in which the load is high, as a pulse falling gradient is steepened, the system response speed is improved.

The second bias current controlling unit 340 may decrease the discharging current as the load is reduced. The reason is that in the case in which the load is low, as the pulse falling gradient is gentle, the system stability is improved.

The driving unit 400 may include a pulse information generator 410, a pulse information provider 420, an upper switch 430, and a lower switch 440.

The pulse information generator 410 may generate first pulse information and second pulse information based on the load voltage. Here, the first pulse information may drive the upper switch 430. In addition, the second pulse information may drive the lower switch 440.

Meanwhile, duty ratios of the first pulse information and the second pulse information may be determined depending on the load. Preferably, as the load is higher, the duty ratios of the first pulse information and the second pulse information may be increased.

The pulse information provider 420 may apply the first pulse information to the upper switch 430. The pulse information provider 420 may apply the second pulse information to the lower switch 440. Here, the pulse information provider 420 may reverse the second pulse information.

The upper switch 430 may be switched by the first switching driving current from the first bias current source 324 and the first pulse information.

In addition, the lower switch 440 may be switched by the second switching driving current from the second bias current source 344 and the second pulse information.

The driving unit 400 may apply the switching control signal to the power switching unit 100 through the configuration as mentioned above.

Figure 5:
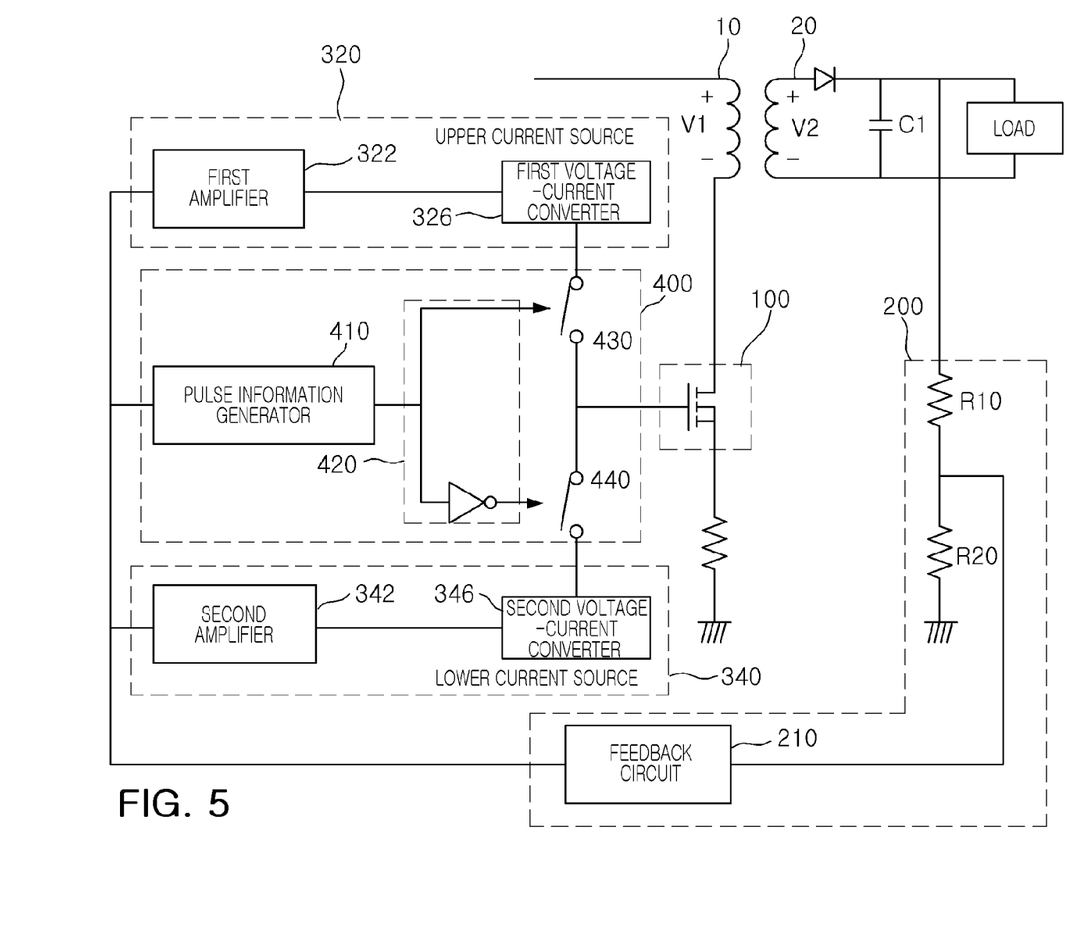
FIG. 5 is a block diagram illustrating a switching mode power supply according to another embodiment of the present invention.

FIG. 5 is a block diagram illustrating a switching mode power supply according to another embodiment of the present invention.

Referring to FIG. 5, the bias current controlling unit may include a voltage-current converter.

More specifically, the first bias current controlling unit may include a first voltage-current converter 326.

The first voltage-current converter may output the first switching driving current according to the load voltage. As the load is high, the first switching driving current output by the first voltage-current converter may be increased.

In addition, the second bias current controlling unit may include a second voltage-current converter 346.

The second voltage-current converter may output the second switching driving current according to the load voltage. As the load is high, the second switching driving current output by the second voltage-current converter may be increased.

Meanwhile, since other components are the same as those of the switching mode power supply according to the embodiment of the present invention described above, a detailed description thereof will be omitted.

Figure 6:
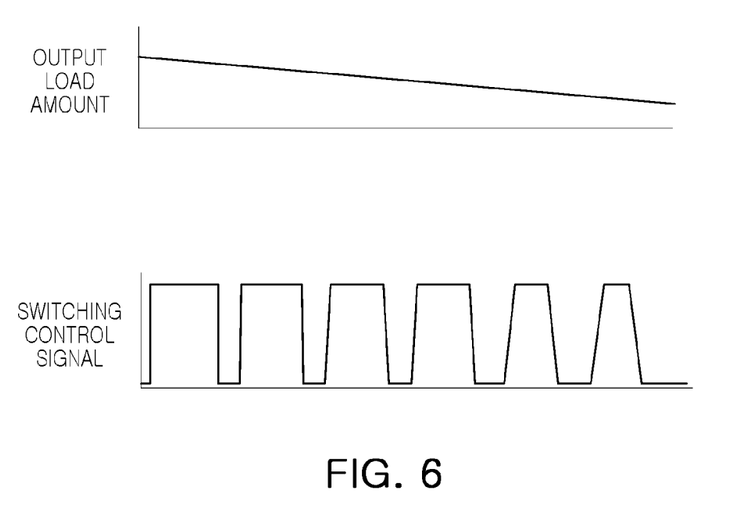
FIG. 6 is a diagram illustrating a switching control signal according to the embodiment of the present invention.

FIG. 6 is a diagram illustrating the switching control signal according to the embodiment of the present invention.

The switching mode power supply according to the embodiment of the present invention may output the switching control signal to be described below.

Referring to FIG. 6, as the amount of load increases, a duty ratio of the switching control signal may increase. In addition, as the amount of load increases, a rising gradient and a falling gradient of a pulse included in the switching control signal may be steepened.

Further, as the amount of load decreases, the duty ratio of the switching control signal may decrease. Further, as the amount of load decreases, the rising gradient and the falling gradient of the pulse included in the switching control signal may be gentle.

Figure 7A:
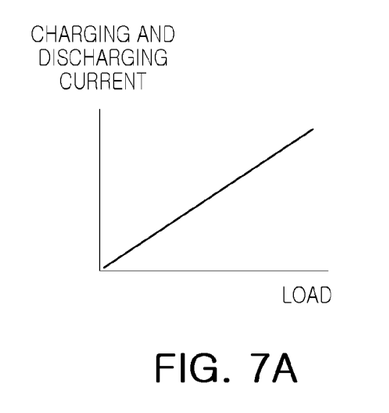
FIGS. 7A and 7B are diagrams respectively illustrating schemes of varying a charging current and a discharging current according to a load.
Figure 7B:
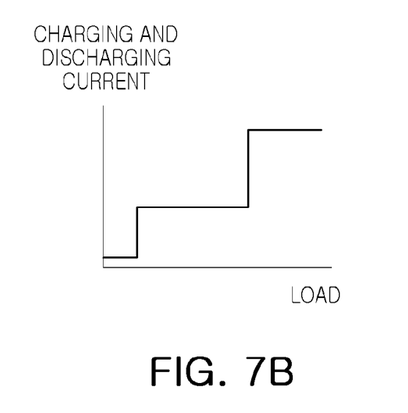

FIGS. 7A and 7B are diagrams respectively illustrating schemes of varying a charging current and a discharging current according to a load.

As shown in FIG. 7A, the charging current and the discharging current for the power switching part 100 may be set to linearly increase in proportion to a magnitude of the load.

As shown in FIG. 7B, the charging current and the discharging current for the power switching part 100 may be set to stepwise increase in proportion to a magnitude of the load.

The switching mode power supply according to the embodiment of the present invention may linearly or stepwise control the bias current for the power switching unit according to the load to thereby change the gradient of the pulse included in the switching control signal.

Therefore, the switching mode power supply according to the embodiment of the present invention increases the charging current and the discharging current for the power switching unit in the case in which the load is high, such that it may have rapid and instantaneous response characteristics for the load.

In addition, the switching mode power supply according to the embodiment of the present invention decreases the charging current and the discharging current for the power switching unit in the case in which the load is low, such that it may have stable output characteristics.

As set forth above, according to the embodiment of the present invention, the switching mode power supply having appropriate response characteristics for a load may be provided.

In addition, according to the embodiment of the present invention also, the switching mode power supply capable of having a prompt response speed under high load conditions and providing a stable output under low load conditions may be provided.

While the present invention has been shown and described in connection with the embodiments, it will be apparent to those skilled in the art that modifications and variations can be made without departing from the spirit and scope of the invention as defined by the appended claims.

What is claimed is:

1. A switching mode power supply having primary and secondary induction coils inductively coupled to each other and converting a voltage applied to the primary induction coil to supply the converted voltage to the secondary induction coil, the switching mode power supply comprising:
   a power switching unit switching the voltage applied to the primary induction coil;
   a load information obtaining unit obtaining load information relating to a load connected to the secondary induction coil;
   a bias current controlling unit controlling a switching driving current based on the load information; and
   a driving unit driving the power switching unit based on the load information and the switching driving current;
   wherein the load information obtaining unit outputs a load voltage;
   wherein the bias current controlling unit includes:
   an amplifier outputting a control current or a control voltage based on the load voltage; and
   a current source controlling the switching driving current based on the control current or the control voltage.

2. The switching mode power supply of claim 1, wherein the bias current controlling unit controls a first switching driving current, a charging current for the power switching unit, based on the load information, and controls a second switching driving current, a discharging current for the power switching unit, based on the load information.

3. The switching mode power supply of claim 1, wherein the bias current controlling unit includes a voltage-current converter.

4. A switching mode power supply having primary and secondary induction coils inductively coupled to each other and converting a voltage applied to the primary induction coil to supply the converted voltage to the secondary induction coil, the switching mode power supply comprising:
   a power switching unit switching the voltage applied to the primary induction coil;
   a load information obtaining unit obtaining load information relating to a load connected to the secondary induction coil;
   a bias current controlling unit controlling a switching driving current based on the load information; and
   a driving unit driving the power switching unit based on the load information and the switching driving current;
   wherein the load information obtaining unit outputs a load voltage;
   wherein the bias current controlling unit includes:
   a first amplifier outputting a first control current or a first control voltage based on the load voltage; and
   a first bias current source controlling a first switching driving current, a charging current for the power switching unit, based on the first control current or the first control voltage.

5. The switching mode power supply of claim 4, wherein the bias current controlling unit controls a first switching driving current, a charging current for the power switching unit, based on the load information, and controls a second switching driving current, a discharging current for the power switching unit, based on the load information.

6. The switching mode power supply of claim 4, wherein the bias current controlling unit includes a voltage-current converter.

7. A switching mode power supply having primary and secondary induction coils inductively coupled to each other and converting a voltage applied to the primary induction coil to supply the converted voltage to the secondary induction coil, the switching mode power supply comprising:
   a power switching unit switching the voltage applied to the primary induction coil;
   a load information obtaining unit obtaining load information relating to a load connected to the secondary induction coil;
   a bias current controlling unit controlling a switching driving current based on the load information; and
   a driving unit driving the power switching unit based on the load information and the switching driving current wherein the load information obtaining unit outputs a load voltage;

wherein the bias current controlling unit includes:

a second amplifier outputting a second control current or a second control voltage based on the load voltage; and a second bias current source controlling a second switching driving current, a discharging current for the power switching unit, based on the second control current or the second control voltage.

8. The switching mode power supply of claim 7, wherein the driving unit includes:

a pulse information generator generating first pulse information and second pulse information based on the load voltage;

an upper switch driven by the first switching driving current and the first pulse information; and a lower switch driven by the second switching driving current and the second pulse information.

9. The switching mode power supply of claim 7, wherein the bias current controlling unit controls a first switching driving current, a charging current for the power switching unit, based on the load information, and controls a second switching driving current, a discharging current for the power switching unit, based on the load information.

10. The switching mode power supply of claim 7, wherein the bias current controlling unit includes a voltage-current converter.

11. A switching mode power supply having primary and secondary induction coils inductively coupled to each other and converting a voltage applied to the primary induction coil to supply the converted voltage to the secondary induction coil, the secondary induction coil for driving a load, the switching mode power supply comprising:

a power switching unit switching the voltage applied to the primary induction coil;

a load information obtaining unit coupled to the secondary induction coil for determining a load voltage relating to the load;

a bias current controlling unit including a current source configured for controlling a switching driving current based on the load voltage; and a driving unit driving the power switching unit based on the load voltage and the switching driving current.

12. The switching mode power supply of claim 10, wherein the driving unit includes:

a pulse information generator generating first pulse information and second pulse information based on the load voltage;

an upper switch driven by the first switching driving current and the first pulse information; and a lower switch driven by the second switching driving current and the second pulse information.

* * * * *